No. 658,235. Patented Sept. 18, 1900.
V. CHEVAL & J. LINDEMAN.
SECONDARY BATTERY.
(Application filed Jan. 19, 1900.)
(No Model.) 2 Sheets—Sheet 2.
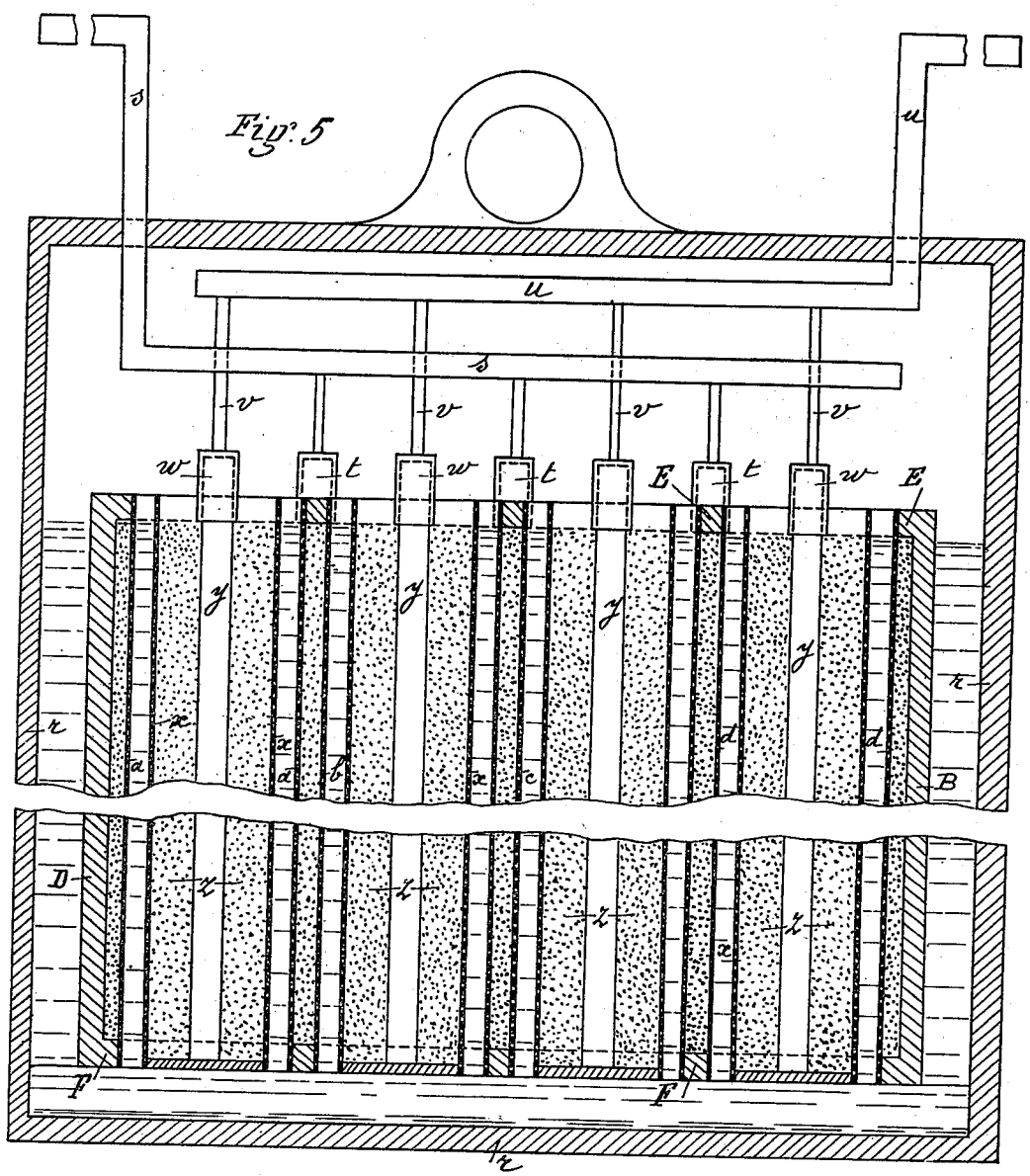
WITNESS
M. H. Miles
F. W. Wright
INVENTORS:
VICTOR CHEVAL
JOSEPH LINDEMAN
BY Howson and Howson
THEIR ATTORNEYS

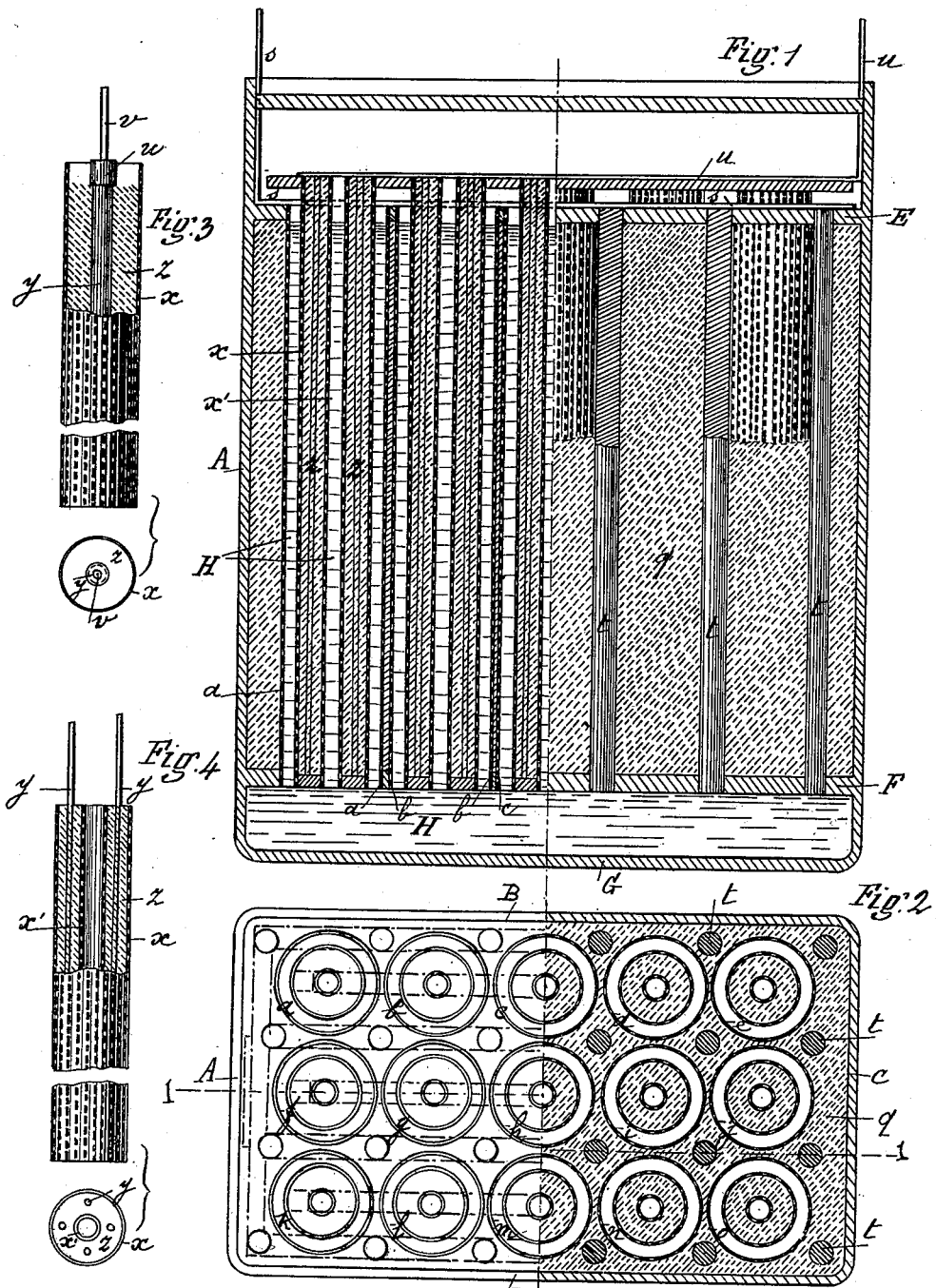

UNITED STATES PATENT OFFICE.

VICTOR CHEVAL AND JOSEPH LINDEMAN, OF BRUSSELS, BELGIUM.

SECONDARY BATTERY.

SPECIFICATION forming part of Letters Patent No. 658,235, dated September 18, 1900.

Application filed January 19, 1900. Serial No. 2,060. (No model.)

*To all whom it may concern:*

Be it known that we, VICTOR CHEVAL and JOSEPH LINDEMAN, subjects of the King of Belgium, residing at Brussels, Belgium, have invented a new and Improved Accumulator-Battery, of which the following is a specification.

The main object of our invention is to so construct an accumulator-battery as to secure a mechanically satisfactory disposition of the active material and its complete utilization electrically.

In the accompanying drawings, Figure 1 is a vertical section of our improved battery, the section being taken upon line 1 1, Fig. 2. Fig. 2 is a plan view, one-half being shown in section. Figs. 3 and 4 are detached views of different forms of cartridge-like parts which may be employed in the making up of one of our electrodes. Fig. 5 is a sectional view of a modified form of battery.

One of our electrodes consists of a suitable number of cartridge-like devices, (illustrated in Fig. 3,) and for convenience we will call them "cartridges." In the form of cartridge shown in this figure the active material $z$ is placed in an envelop $x$ of insulating material perforated with a great number of small holes, the envelop being closed at its lower end and preferably of cylindrical or prismatic form. Plunged into the active material, and preferably in the axis of the cartridge, is a conducting-rod $y$, of carbon or of lead alloyed with antimony, provided at its upper end with a terminal $w$, provided with a thin lead rod $v$ to be connected with the connecting bars or plates $u$. The form of these cartridges may be modified, as shown in Fig. 4. In this modification the active material $z$ is placed between two envelops $x$ and $x'$ of insulating material perforated with a large number of small holes and resting upon an imperforate bottom. The electrolyte can enter the interior of the inner envelop $x'$. Into the mass of active material are plunged one or more conducting-rods of carbon or lead and antimony, which are connected to the terminal bars or plates $u$. The form of cartridge just described is illustrated as employed in the battery Fig. 2, while the form of cartridge described with reference to Fig. 3 is illustrated as employed in the battery shown in Fig. 5. The other electrode is formed in the following manner: Each of the cartridges described above is surrounded with an outer envelop of insulating material $a\ b\ c\ d$, &c., Figs. 1, 2, and 5. Such outer envelops are perforated with a large number of small holes and are secured at their ends to two plates E and F, provided for this purpose with large openings at suitable distances apart. These plates are supported by four vertical walls A, B, C, and D of a box, Figs. 1 and 2, whose bottom G is at a certain distance from the plate F. In this construction, Figs. 1 and 2, the walls and bottom A, B, C, D, and G are imperforate. Between the several outer insulating-envelops $a\ b\ c$, &c., and the walls A B C we pack active material $q$, in which are placed conducting-rods $t$, of the same material as the other electrode. These conducting-rods are soldered to connecting terminal rods or plates $s$. The walls A B C and bottom G contain the electrolyte H, which being introduced into the spaces between the insulating envelops $a\ b\ c$, &c., and the cartridges contained therein comes into contact at the same time with the two sets of electrodes.

Instead of constructing the battery so that the walls A B C D and bottom G contain the electrolyte, the electrodes constructed as described may be placed in an external receptacle $r$ to receive the electrolyte, as illustrated in Fig. 5.

We claim as our invention—

In an accumulator-battery, an electrode consisting of a series of cartridges with perforated envelops containing active material, in combination with another electrode consisting of other perforated envelops surrounding the said cartridges, with intervening spaces for the electrolyte, active material packed around said outer envelops and between them and the walls of the battery, and conducting-rods in such active material, substantially as described.

In testimony whereof we have signed our names to this specification in the presence of two subscribing witnesses.

VICTOR CHEVAL.
JOSEPH LINDEMAN.

Witnesses:
GUST PIERRY,
EMILE NUYTS.